United States Patent [19]

Stuhr

[11] Patent Number: 4,674,280
[45] Date of Patent: Jun. 23, 1987

[54] APPARATUS FOR THE STORAGE OF ENERGY

[75] Inventor: Hans W. Stuhr, Aschaffenburg, Fed. Rep. of Germany

[73] Assignee: Linde Aktiengesellschaft, Wiesbaden, Fed. Rep. of Germany

[21] Appl. No.: 796,918

[22] Filed: Nov. 12, 1985

Related U.S. Application Data

[63] Continuation of Ser. No. 450,639, Dec. 17, 1982, abandoned.

[51] Int. Cl.⁴ ............................................. F15B 1/02
[52] U.S. Cl. .................................. 60/413; 180/165; 60/414; 60/416
[58] Field of Search ............... 60/413, 414, 416, 417, 60/418; 180/165; 91/5

[56] References Cited

U.S. PATENT DOCUMENTS

| | | | |
|---|---|---|---|
| 3,823,792 | 7/1974 | Dinkloh et al. | 60/445 |
| 3,892,283 | 7/1975 | Johnson | 180/165 |
| 4,215,545 | 8/1980 | Morello et al. | 60/413 |
| 4,382,484 | 5/1983 | Anderson et al. | 60/418 |

FOREIGN PATENT DOCUMENTS 161632  3/1962  U.S.S.R. ........................... 60/416

Primary Examiner—Robert E. Garrett
Assistant Examiner—H. A. Odar
Attorney, Agent, or Firm—Buell, Ziesenheim, Beck & Alstadt

[57] ABSTRACT

An hydraulic apparatus for the storage of energy is provided having pump means driven by a source of energy, a pressure line receiving pressure fluid from said pump means, means in said line for maintaining a constant pressure therein from said pump means, at least one pressure reservoir connected to said pressure line receiving fluid pressure therefrom and returning fluid pressure thereto and a restrictor means in said pressure line between the pump means and reservoir restricting flow in said line to maintain a predetermined constant pressure therein.

20 Claims, 3 Drawing Figures

APPARATUS FOR THE STORAGE OF ENERGY

This is a continuation of application Ser. No. 450,639, filed Dec. 17, 1982, now abandoned.

The present invention relates to apparatus for the storage of energy and more particularly to an apparatus for the storage of hydraulic energy, preferably excess hydraulic energy in certain operating states, such as during braking, from a unit in which a predetermined pressure is to be maintained and where a pressure reservoir is connected to the line through a branch line.

In the familiar arrangements for the storage of pressure energy the pressure reservoir is directly connected through a connecting line to the line in which the excess energy can develop. As a result, when the reservoir is discharged, i.e., pressureless, the line must also be pressureless inasmuch as a pressure equalization occurs through the connection line. The pressure in the line to which the reservoir is connected rises only with increasing loading of the reservoir, i.e., increasing pressure in it. Such arrangements cannot be used for many installations because a certain prescribed pressure must be maintained in the line during the operating state in which the excess hydraulic energy develops.

For example, if the installation is comprised of an internal-combustion engine and a drive unit consisting of a pump and a hydraulic motor and is to be braked by setting the hydrostatic drive to a low output r.p.m., there must then be a high pressure in the discharge line of the hydraulic motor, in which case pressure medium is fed under this pressure to the pump, which passes on the energy fed in this manner to the internal-combustion engine. If the pressure in this drive line were reduced by connecting a discharged pressure reservoir to this drive line, the braking action would thus drop out or be reduced to a value corresponding to the slight residue remaining, until the reservoir is loaded. However, since the braking action is the goal, this is not permissible.

The invention proposes to store this excess energy as extensively as possible in a hydraulic system with a line in which excess hydraulic energy can be carried, without adversely affecting the hydraulic system by storing the pressure energy, i.e., without reducing the pressure in the line in which a predetermined pressure is to be maintained, but on the contrary to be able to influence arbitrarily even the discharge of excess energy if possible, e.g., to be able to influence a braking process in the desired manner and still utilize the excess energy to the maximum possible.

For solving this problem according to the invention, a restrictor is located in the branch line connecting the pressure line in which the excess energy is located with the pressure reservoir. The pressure reservoir can be thus connected to the drain line coming from the restrictor. By means of the restrictor, the pressure in front of it and thus in the line in which the excess energy arises can be maintained. Nevertheless, the stream flowing through the restrictor will be fed to a pressure reservoir.

A drive aggregate with an internal-combustion engine, a hydraulic system, an energy reservoir, and a restrictor, which is designed for a braking phase, is of course already known. In this familiar system, however, it is provided that the restrictor is switched in and the stream flows through it only when the energy reservoir is filled to the point where it cannot absorb any more energy, in which case the energy stream draining off through the restrictor is again fed to a pressureless line, such that the energy of the stream flowing through the restrictor is completely withdrawn from further utilization. Here, as in the case of restrictors in general, the restrictor also serves to maintain a certain pressure in the line in front of this restrictor, but a connection with the energy reservoir is only conceptually effected only to the extent that the restrictor is to be switched in when the energy reservoir is fully loaded and in the case of a prolonged braking more energy develops than the reservoir capacity can handle (DE-OS No. 24 26 058). This arrangement, in which the restrictor is activated only when the reservoir is full, thus leads precisely away from the solution according to the invention, which proposes to achieve an influenceable throttling action, in particular, a controlled braking action, even with an empty reservoir. The possibilities of energy storage in hydraulic pressure reservoirs known to date are also treated in: *Possibliities of Energy Saving in Hydraulics* in o+p Olhydraulik und Pneumatic 25 (3), 51 (1981). Another example of pressure reservoirs that are connected directly without restrictors to a main pressure line and are connected to the adjustable hydraulic motors, which are capable of swinging through the zero-stroke position in both directions, is also treated in: *Accumulator-Charged Hydrostatic Drive for Cars Saves Energy* in HYDRAULICS AND PNEUMATICS, October 1974, pp. 180–182.

The concept of storing the energy of the stream flowing through the restrictor to the greatest extent possible is not considered here; rather, only the conventional throttling for the purpose of maintaining the pressure is used here when the storage process is completed.

It is particularly expedient if the restrictor provided in accordance with the invention is adjustable, especially arbitrarily adjustable. The state of the hydraulic system, e.g., the braking process, can be influenced by adjusting the pressure in front of the restrictor in the desired manner by regulating the opening of the restrictor and thus the throttling effect in it. The stream flowing through the restrictor is stored in the pressure reservoir. The fact that an arbitrarily selectable pressure can be impounded in front of the restrictor and thus it can be maintained in the hydraulic system distinguishes the arrangement according to the invention from the familiar systems and arrangements in which the pressure reservoir is connected directly to the line carrying the pressure. If the pressure medium under pressure in such an arrangement of the familiar type is to be used in that a displacement machine delivers against this pressure and thus absorbs braking energy, this goal could not be achieved at the present time with the familiar installations by connecting a pressureless tank to the delivery line of the displacement machine because the delivery line of this displacement machine would thus also become pressureless, such that it would feed against only a slight resistance and accordingly absorb only a slight braking action. The pressure in the delivery line and thus the braking energy absorbed by the pump would increase only with an increase in the pressure impounded in the pressure reservoir, in which case this process would be predictable, but could not be influenced, e.g., by the operator of a vehicle. Rather, the operator first observed upon passage to the braking state or during a change-over, by which the pressure reservoir was connected, that no braking effect resulted and that a braking action, which he is unable to influence, occurs slowly at first and then increases with the loading of the reservoir. In the arrangement according to the invention, in contrast, the attendant, e.g., the operator of a vehicle, can influence the braking state arbitrarily from the first moment by regulating the pressure in front of the restrictor or by arbitrary regulation of the restrictor opening. Of course, utilization of the energy will thus be eliminated (usual expression: "destroyed") in the restrictor provided according to the invention, but this is only a portion of the energy (which has to be rendered useless in some manner in the other familiar designs also), but the full stream flowing through the restrictor is fed to the reservoir, but a retroaction of the initially slight pressure in the reservoir through the restrictor on the line in which the excess hydraulic energy develops, and on the hydraulic system to which this line belongs, e.g., the delivery line of a pump serving for the braking, is avoided. The higher the reservoir pressure rises, the lower the pressure gradient at the restrictor and thus also the energy portion removed from utilization by the energy change in the restrictor becomes less.

It is particularly advantageous if the restrictor is installed in a pressure-limiting valve or a pressure-limiting valve is used as the restrictor, preferably a pressure-limiting valve adjustable to an arbitrarily selectable pressure. If the reservoir pressure reaches the pressure at which the pressure-limiting valve is set, the latter open fully and permits a throughflow without resistance.

Another essential phase of the invention proposes to keep the energy loss as low as possible in filling the pressure reservoir in order to optimize the filling process and also to optimize recovery of the energy as much as possible. As already stated, during the filling of the reservoir the pressure gradient at the restrictor provided in accordance with the invention is decisive for the portion of energy removed from utilization by the throttling. The lower this pressure gradient can be maintained, or the smaller the stream flowing through under a high pressure gradient, the greater the useful portion of the energy.

In most application cases the maximum excess energy is also known, e.g., the maximum braking energy, due to the vehicle mass and maximum speed of the vehicle.

The partitioning of pressure reservoirs and the parallel-connection of several pressure reservoirs of identical size are also already known, inasmuch as the construction costs for several small reservoirs are less than for one large reservoir, on the large wall surfaces of which the pressure would exert a greater force than the same pressure exerts on the smaller wall surfaces of a smaller reservoir. In the familiar arrangements the reservoirs are connected in parallel to the pressure line and in the case of gas pressure cushion reservoirs the gas sides are also connected in parallel to prevent the development of unequal pressure states in the individual reservoirs at a certain point in time.

In accordance with another essential phase of the invention, it is provided that a branch line is connected to the connection point between the restrictor provided in accordance with the invention and the pressure reservoir and that this branch line leads to another pressure reservoir, and that another, i.e., additional restrictor adjustable to an arbitrary pressure in front of the restrictor is located in this branch line, e.g., a pressure-limiting valve, which is regulated as a function of the pressure in front of this restrictor and begins to open when the pressure in front of the restrictor has reached the arbitrarily selected pressure value, in which case this arbitrarily selected value corresponds to the maximum permissible pressure of the reservoir that is connected between the two restrictors. This additional restrictor thus remains fully closed so long as the pressure in the first pressure reservoir has not reached its maximum value. As long as this additional restrictor is closed, the stream thus flows through the first restrictor only into the first pressure reservoir. The second, i.e., additional restrictor begins to open and exert a throttling effect only when this first pressure reservoir is completely filled.

This coordination of additional pressure reservoirs and restrictors can be continued and repeated as often as desired, in which case the storage capacity is increased by the insertion of another reservoir, or the total storage capacity is divided into several reservoirs, in which case the basic concept of the present invention is utilized with respect to each reservoir. In contrast to the reservoir arrangements known to date, with parallel-connected reservoirs, the final effect is different in the arrangement according to the invention.

Namely, if the sum of the reservoirs and thus the total storage capacity is set at a certain value of the storable energy, but only a portion of the total energy that can be stored is fed to the reservoirs during a given braking phase up to its conclusion, in the parallel connection known to date all the reservoirs are loaded to the same degree, only up to a fraction of their maximum pressure, which can then be utilized rather poorly due to the low pressure level. In contrast, in the invention arrangement a corresponding portion, e.g., half of the pressure reservoirs are not loaded, but the ones that are are loaded to the full reservoir pressure, which can be efficiently utilized in another operating phase, e.g., the subsequent acceleration phase.

In order to be able to utilize the stored pressure energy advantageously, another phase is provided according to the invention: a by-pass check valve opening to the pressure reservoirs is located between the pressure line carrying the excess hydraulic energy and the pressure reservoirs and a branch line is connected between the by-pass check valve and the pressure reservoir or the first pressure reservoir, in which branch line an arbitrarily actuatable valve is located, where this branch line leads to a point at which the stored pressure energy can be utilized. This can thus be a line that leads to a hydraulic motor. This valve will be arbitrarily opened when the stored pressure energy is to be used. In the case of several reservoirs connected in series according to the invention, all the restrictors of the loaded reservoirs can be fully opened simultaneously or one after the other for utilization of the stored energy, depending on which pressure draw-down is more favorable for the acceleration process desired.

The invention can be expediently applied in connection with a prolonged-operation hydraulic brake, in which a displacement pump connected with the consumer to be braked, e.g., the wheels of a vehicle, delivers against a restrictor and where the portion of the total braking energy involved in the first part of the prolonged braking must be stored, in which case the reservoir capacity is conveniently selected so that the weight of the reservoir and the liquid to be stored do not represent too great a load or the reservoir volume is not too perturbing, or the stored partial energy can also be expediently utilized in a subsequent acceleration process. The invention can however also be expediently applied in connection with a drive system with a primary energy source and a hydrostatic drive consisting of a pump and a hydraulic motor, in particular, a hydrostatic drive operating in closed circuit, in which case a branch line departs from each of the two lines connecting the pump and the hydraulic motor and leads to a change-over valve that is controlled by the regulating unit of the pump and connects the one of the two lines of the closed circuit that is the line of the closed circuit carrying the by-pass from the hydraulic motor to the pump in the case of the direction of driving rotation, e.g., the direction of travel in the case of a vehicle, with the branch line leading to the restrictor. In normal operation, in which the driving is done through the hydrostatic drive, only the pressure that is maintained by a feed pump prevails in the line of the closed circuit through which the working fluid of the hydraulic pump is fed in. However, if the hydraulic motor feeds to the pump in a braking state, a high pressure corresponding to the braking state is present in this line since in this case energy is transfered from the hydraulic motor to the pump. The two components, the adjustment setting of the pump in a certain deliver direction and which of the two lines of the closed circuit carries the high pressure, thus determine whether a driving or a braking phase is present. Accordingly, the braking state can be determined from the setting of the pump and the pressure transfer in a drive line (DE-OS No. 21 39 584).

It is particularly advantageous if the valve that connects the line carrying the stream to the pump with the line to the restrictor in front of the pressure reservoir is designed so that it opens only when a predetermined maximum pressure is exceeded so that introduction into the pressure reservoir through the restrictor takes place only during operating phases in which a substantial braking action actually occurs.

In devices with a counterweight, e.g., construction machines or lift loaders (counterweight fork lifts), the pressure reservoir or most of the pressure reservoirs can be arranged so that their mass acts as a counterweight to the mass of the counterweight, especially if the reservoirs are filled, particularly during operating states, in which a high degree of counterweight is desired. In the case of a counterweight of metal, e.g., cast iron, the pressure reservoir or each reservoir can be incorporated into the counterweight in the form of an appropriately dimensioned cavity.

In the foregoing general description of the prior art and the present invention, I have set out certain objects, purposes and advantages of this invention. Other objects, purposes and advantages of this invention will be apparent from a consideration of the following description and the accompanying drawings in which.

Figure 1:
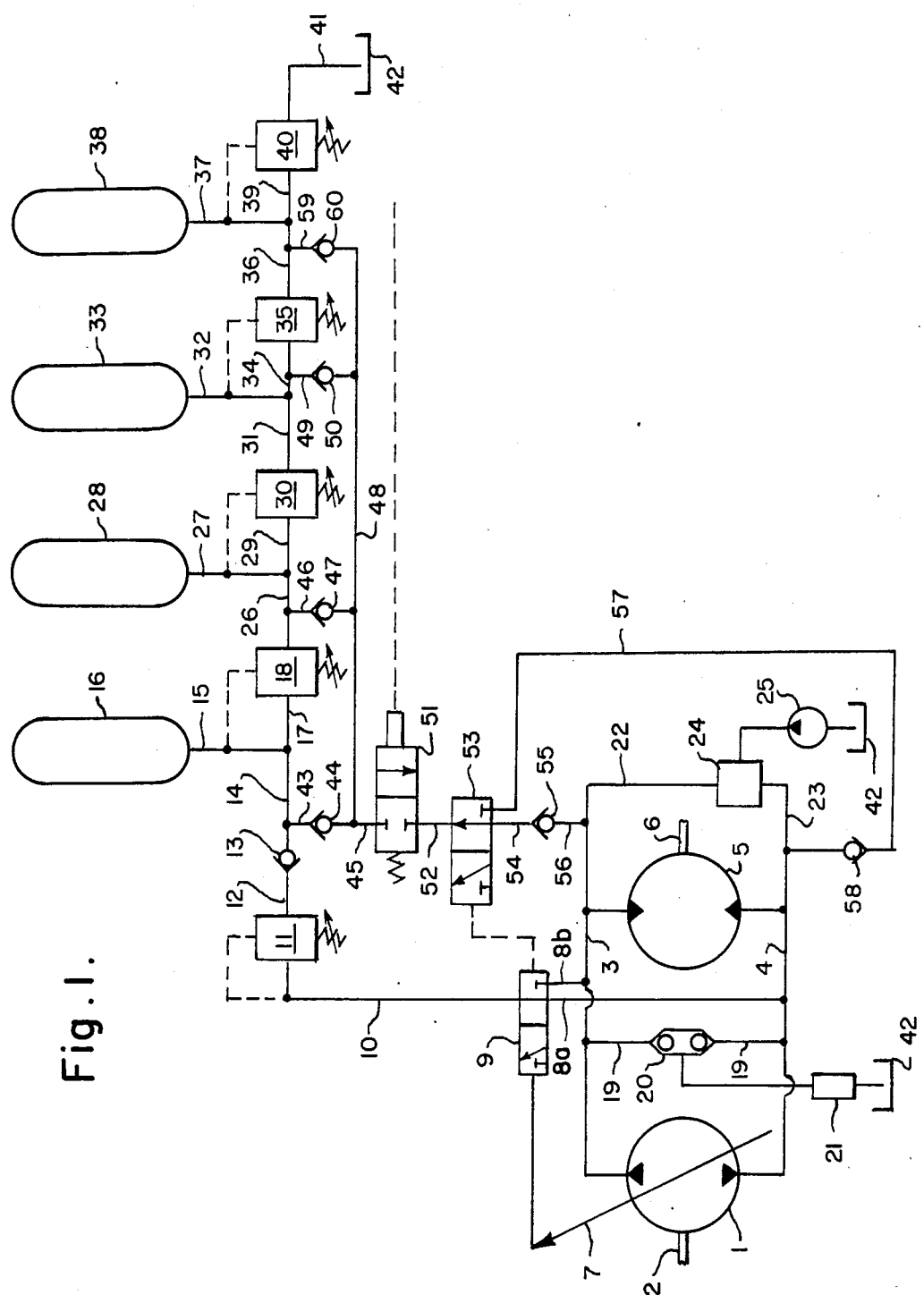
FIG. 1 shows an energy storage arrangement according to the invention with several reservoirs connected to a hydrostatic drive operating in closed circuit.

The shaft 2 of the adjustable hydraulic pump 1 is driven by a primary energy source such as an internal combustion engine (not shown in the drawing). The pump 1 is connected in closed circuit through lines 3 and 4 with the hydraulic motor 5, whose shaft 6 drives a consumer of mechanical energy (not shown in the drawing), which has an inert mass and is to be not only driveable, but also brakeable through the hydrostatic drive 1, 3, 4, 5. If the final control element 7 of the pump 1 is set so that the pump 1 feeds into line 3, the shaft 6 of the hydraulic motor 5 rotates in a given direction, e.g., for forward travel in the case of a vehicular drive. If the final control element 7 of the hydraulic pump 1 is set so that the pump 1 feeds into line 4, the hydraulic motor 5 is impelled in the opposite direction and accordingly shaft 6 rotates in the opposite direction.

A branch line 8a is connected to line 4 and a branch line 8b is connected to line 3, in which case these two branch lines 8a and 8b are connected to a 2-position/3-connection valve 9, to the third connection of which the line 10 is connected. If the final control element 7 is set in the manner described so that the pump 1 feeds into line 3 and the hydraulic motor 5 drives the shaft 6, the delivery pressure of pump 1 is present in line 3, while only the lower by-pass pressure is present in line 4, with which the pump 1 draws from line 4. Now if the shaft 6 is driven as a result of the mass moment of inertia of the consumer driven by shaft 6, the hydraulic motor 5 forces working fluid into line 4 so that the latter contains the pressure that, together with the delivery stream of hydraulic motor 5, furnishes the braking energy that is absorbed at the shaft 6 of the hydraulic motor 5 and is fed to the hydraulic pump through line 4 and is put out by this pump through shaft 2.

The final control element 7 of the hydraulic pump 1 is connected with the multi-way valve 9 so that at the setting of the hydraulic pump 1 in which it feeds into line 3 the line 8b is connected through the multi-way valve 9 with the line 10 and accordingly at the setting of the hydraulic pump 1, at which it feeds into line 4 in order to drive the hydraulic motor in the opposite direction of rotation, the line 8a is connected through the multi-way valve 9 with the line 10.

The line 10 connected to the third connection of multi-way valve 9 leads to an adjustable pressure-limiting valve 11, whose output side is connected through a line 12 and a by-pass check valve 13 to a line 14, which continues in a line 15 that leads to a pressure reservoir 16. A line 17 is connected to the line 14, 15 and leads to a pressure-limiting valve 18, which is closed as long as the pressure in line 17 does not reach the predetermined maximum pressure.

A line 19 is connected to each of the two lines 3 and 4, both of which lead to a change-over valve 20, which connects the one of the two lines 3 and 4 carrying the higher pressure with the pressure-limiting valve 21. A line 22 is also connected to line 3 and a line 23 is connected to line 4, where the two lines 22 and 23 lead to a change-over valve 24, which connects the one of the two lines 22 and 23 carrying the lower pressure with the adjustable feed pump 25, whose regulating unit is designed so that the pump 25 maintains a predetermined pressure in the line 22 or 23 connected with it through the valve 24, i.e., it produces a greater delivery stream at decreasing pressure.

The mechanism of action of the arrangement is as follows: If the final control element 7 of the pump 1 is set so that the pump 1 delivers pressure medium under pressure in line 3, which acts on the hydraulic motor 5 so that the latter drives the consumer through shaft 6, the high delivery pressure of pump 1 is present in line 3 and the lower pressure is present in line 4 and is maintained by pump 25. The line 8b is connected through valve 9 with line 10 so that the low pressure produced by the feed pump 5 is present in line 10 in front of the pressure-limiting valve 11; the latter pressure is not sufficient to open the pressure-limiting valve 11. However, if the system now passes into the braking state, so that the consumer drives the hydraulic motor 5 through the shaft 6, the hydraulic motor 5 draws from line 3 and forces pressure medium under pressure into line 4, through which the pressure medium of pump 1 is conveyed, the pump that furnishes energy to the shaft 2. The pressure present in line 4 is transfered to line 10 through line 8b because line 8b is still connected with line 10 via valve 9. The pressure-limiting valve is thus set at a pressure that matches the braking moment on the hydraulic motor 5, which is desirable for braking the consumer. If the pressure in line 10 exceeds the value set at the pressure-limiting valve 11, the latter opens such that only the set value is present in line 10 and allows a corresponding stream, appropriately throttled, to flow from line 10 into line 12 and from the latter through the by-pass check valve 13 into line 14. The pressure medium flows from line 14 through line 15 into the pressure reservoir 16. Since the latter is initially pressureless, there is initially only a low pressure in line 14 and thus also in line 17, such that the pressurelimiting valve 18 remains closed. With increasing loading of the pressure reservoir 16, the pressure in line 15 and thus in line 14 and thus in line 12 increases such that the pressure gradient that must be reduced in the pressure-limiting valve or relief-valve jet 11, continues to decrease. The desired pressure is always maintained in line 10 and thus in line 4 by the relief-valve jet 11. On the other hand, the braking energy is stored in the pressure reservoir 16.

If the final control element 7 of pump 1 is set so that it feeds into line 4 and accordingly acts on the hydraulic motor 5 in the opposite direction and drives the shaft 6 in the opposite direction of rotation, the line 8a is connected with line 10 through the multi-way valve 9 due to this setting of the final control element 7, such that the same effect results with the opposite direction of rotation of shaft 6.

A line 26 is connected to the outlet side of relief-valve jet 18 and a line 27 that leads to a pressure reservoir 28 is connected to it. A line 29 is connected to the line 26, 27 and leads to a relief-valve jet 30. A line 31 is connected to the outlet of the latter and a line 32, which leads to a pressure reservoir 33, is connected to line 31. A line 34 is connected to the line 31, 32 and leads to a relief-valve jet 35. A line 36 is connected to the outlet of relief-valve jet 35 and a line 37, which leads to a pressure reservoir 38, is connected to line 36. A line 39 is connected to the line 36, 37 and a relief-valve jet 40 is connected to line 39. A line 41, which leads to a pressureless tank 42, is connected to the outlet of relief-valve jet 40. The spring spaces of the relief-valve jets 11, 18, 30, 35, and 40 are relieved of pressure (connected with the pressureless tank 42).

The mechanism of action of the pressure accumulator is as follows: The opening pressure of the relief-valve jet 18 corresponds to the maximum pressure of the pressure reservoir 16 and is somewhat higher than the maximum pressure of the relief-valve jet 11. The relief-valve jet 18 thus remains fully closed as long as the pressure reservoir 16 is not fully loaded. If the pressure reservoir 16 has reached its maximum pressure, it is also present in line 17 and thus the relief-valve jet 18 begins to open and produces a throttling connection between lines 17 and 26 so that the maximum pressure of the reservoir 16 is maintained in line 17. Since the pressure in line 26 and thus in line 29 is lower than the actuating pressure of relief-valve jet 30, the latter remains closed, such that the pressure medium flowing through the relief-valve jet 18 flows through the lines 26 and 27 into the pressure reservoir 28 and charges it. Only when the reservoir 28 reaches its maximum pressure, to which the response pressure of the relief-valve jet 30 is set, does the latter begin to open and have a throttling effect so that the maximum pressure of the reservoir 28 is maintained in line 29, but the subsequent pressure medium flows through the relief-valve jet 30 into line 31 and from the latter through line 32 into the reservoir 33, in which case the relief-valve jet 35 first remains closed until the reservoir 33 has also reached its maximum pressure and then the relief-valve jet 35 begins to open and the subsequent pressure medium flows through lines 36 and 37 to the reservoir 38. If the latter is also fully charged, the relief-valve jet 40 opens and allows the subsequent pressure medium to flow off through line 41 into the pressureless tank 42. That is, with an increasing amount of energy to be stored, according to the series, first the pressure reservoir 16 is charged, then reservoir 28, then reservoir 33, and finally reservoir 38 are charged, until the last reservoir 38 is fully charged. However, if the total amount of energy to be introduced is sufficient to charge only reservoir 16, the reservoirs 28, 33, and 38 remain empty; accordingly, if the energy introduced is sufficient to charge only reservoirs 16 and 28, these two reservoirs become charged and the reservoirs 33 and 38 remain empty, and so on.

A line 43 is connected to line 14 and leads through a by-pass check valve 44 to a line 45. A line 46 is connected to line 26 and leads through a by-pass check valve 47 to a line 48. A line 49 is connected to the line 34 and leads through a by-pass check valve 50 also to the line 48. Finally, a line 59 is connected to the line 36 and leads through a by-pass check valve 60 also to the line 48, which in turn is connected to line 45. The line 45 is connected to a 2-position/2-connection multi-way valve 51, which is arbitarily actuatable. A multi-way valve 53 is connected to the outlet 52 of multiway valve 51 and is also connected with the final control element 7 of the pump 1 and connects in the one position the connection 52 with the line 54, which is connected through a by-pass check valve 55 with the line 56, which is connected with the line 22. A line 57 is connected to the third connection of the 2-position/3-connection multi-way valve 53 and it is connected through the by-pass check valve 58 to the line 53. The multi-way valve 53 is connected with the final control element 7 of pump 1 such that if pump 1 feeds into line 3, the connection 52 is connected with line 56 and if pump 1 feeds into line 4, the connection 52 is connected with line 57.

If the multi-way valve 51 is closed, the pressure fluid stored in the reservoirs 16, 28, 33 and 38 or in any of these reservoirs cannot drain off because if the pressure in line 10 drops, the by-pass check valve 13 closes. However, if the multi-way valve 51 is opened, a connection is established between the pressure reservoirs 16, 28, 33, and 38 and the line 3 or 4 of the closed drive into which the pump 1 delivers. If the pressure in the pressure reservoirs 16, 28, 33, or 38 is greater than the pressure in line 3 or 4, the pressure medium flows out of these reservoirs in addition to the stream delivered by pump 1 into the line 3 or 4 in question, such that an increased flow is fed to the hydraulic motor 5. In this case the r.p.m. of the hydraulic motor 6 is no longer determined by the setting of the final control element 7 of the hydraulic pump 1. Besides, a discharging of the pressure reservoirs 16, 28, 33, and 38 will take place only if and to the extent that the pressure in them is higher than the delivery pressure of the hydraulic pump 1. If one or more of the pressure reservoirs 16, 28, 33, and 38 is pressureless, it has no influence since the by-pass check valve 44 or 47 or 50 or 60 prevents an overflow through line 48 into the pressureless tank.

If the energy stored in the reservoirs 26 or 28 or 33 or 38 is to be utilized only if pump 1 feeds into the line 3 and shaft 6 is thus driven in a certain direction of rotation, the multi-way valve 53, line 57, and thus the by-pass check valve 58 can drop out.

During the charging of the reservoirs the relief-valve jet 11 is completely open when relief-valve jet 18 begins to open in a throttling manner. Likewise, the relief-valve jets 11 and 18 are completely open when relief-valve jet 30 begins to open and, accordingly, the relief-valve jets 11, 18 and 30 are completely open when relief-valve jet 35 begins to open. In order to assure this, either a corresponding setting of the response pressure of the various relief-valve jets 11, 18, 30, and 35 can be provided, so that the next one always opens only when the preceding ones are fully open, or an additional control line with an additional control device can be provided, which completely controls the preceding relief-valve jet or jets in direction of flow.

An additional consumer 57a may be connected to line 57 through branch line 57b and valve 57b and valve 57c, with consumer 57a discharging to reservoir 57d.

Figure 2:
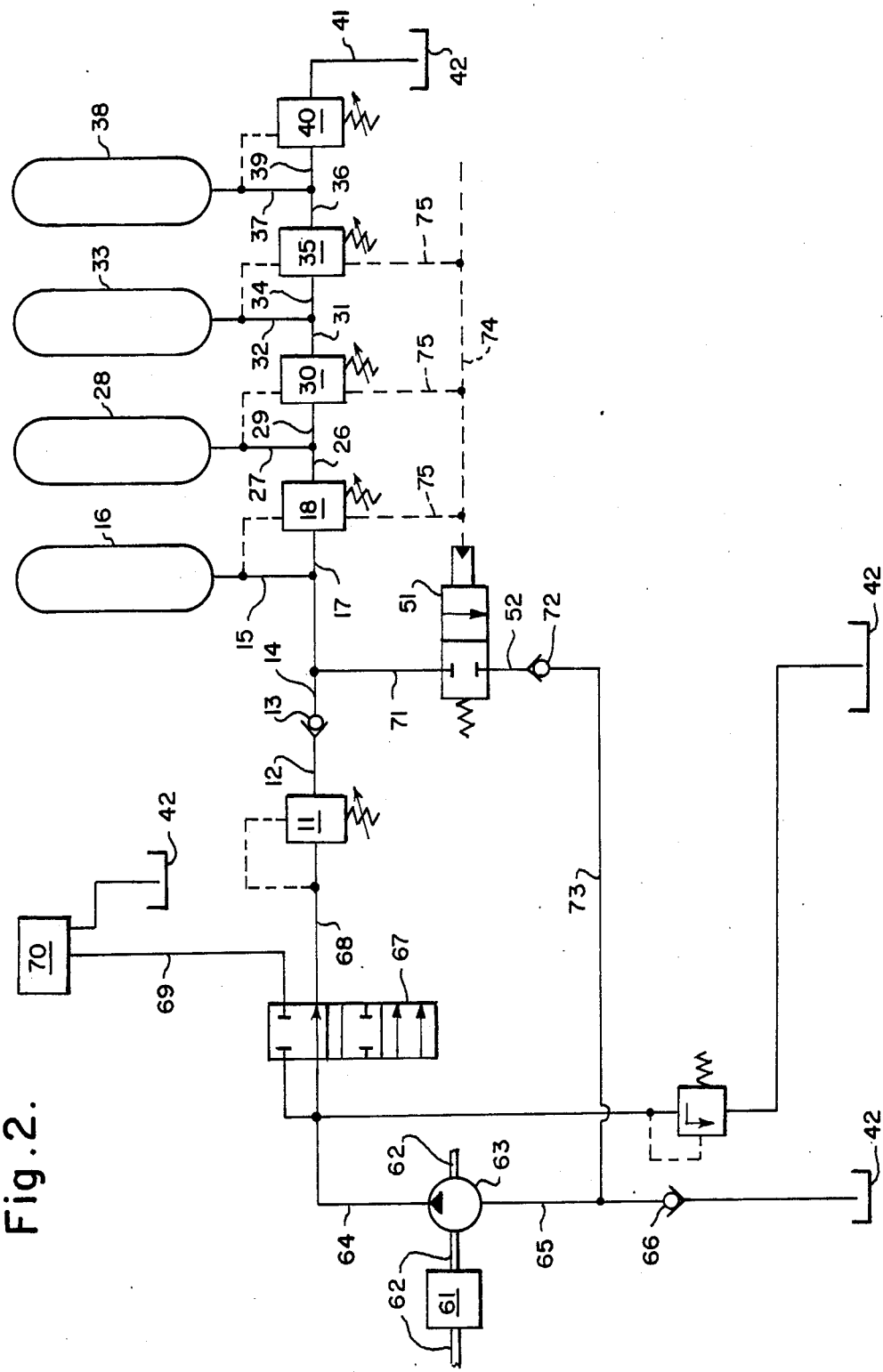
FIG. 2 shows the same energy storage system with connection to a hydrostatic system operating in open circuit.

In the embodiment according to FIG. 2, the components 11–42 correspond to the components with the same reference numbers in FIG. 1. In the implementation according to FIG. 2, however, there is a primary energy source 61 that drives a hydraulic pump 63 through the shaft 62; the hydraulic pump 63 delivers into a line 64 and draws through a line 65, in which a by-pass check valve 66 is located. The shaft 62 can also be connected with another consumer (not shown in the drawing), which is also capable of imparting energy to the shaft 62. The line 64 leads to two connections of the 3-position/4-connection valve 67 (the two connections on the left in FIG. 2 can also be combined into one and, accordingly, a 3-position/3-connection valve can be provided instead of valve 67). In the circuit arrangement shown in the drawing, the multi-way valve 67 connects the line 64 with line 68 and shuts off line 69, which carries hydrostatic energy to a consumer 70. In the second switch position the valve 67 connects line 64 with line 69 and shuts off line 68. In the third switch position the valve 67 connects line 64 with both line 69 and line 68.

If the valve 67 is in the switch position in which line 64 is connected only with line 69, the stream delivered by the pump 63 goes completely to the consumer 70. However, if this consumer 70 is to receive no energy and the pump 63 still delivers a stream due to the continued running of the primary energy source 61 or because the other consumer gives off energy to it through shaft 62 and if the multi-way valve 67 is in the switch position in which it connects line 64 with line 68, the energy contained in the stream delivered by pump 63 will be stored in the described manner in the pressure reservoirs 16, 28, 33, or 38. In the third switch position of valve 67 the consumer 70 is connected in parallel to the reservoirs, that is, the reservoirs are charged only if the pressure medium flows to the consumer 70 with the desired pressure, but the consumer 70 does not receive the full stream.

A line 71 is connected to the line 14 and leads to the arbitrarily controlled multi-way valve 51, to the outlet 52 of which the line 73 is connected through the by-pass check valve 72; line 73 leads to the suction side of pump 63. The valve 51 can be arbitrarily controlled through the control line 74, in which case branch control lines 75 depart from the control line 74 and lead to the relief-valve jets 18, 30, 35. The valves are designed here so that first the valve 51 controls and then the relief-valve jets 35, 30, and 18, or inversely in the analogous sequence, which induces an expedient sequence of the emptying of the pressure reservoirs 16, 28, 33, and 38 one after the other.

The pressure medium flowing through the line 73 to line 65 on the suction side of the pump 63 increases the pressure on the suction side of the pump 63 and thus reduces the pressure gradient at the pump 63 and thus its energy intake so that the energy stored in the reservoirs 16, 28 and 33 and 38 is fed to the consumer 70, without destroying the dependence of the moving speed of consumer 70 on the delivery stream of pump 63 if only consumer 70 is connected with the line 64.

Here too, the mechanism of action of the relief-valve jets 11, 18, 30, and 35 is such that they are fully closed so long as the pressure in the line leading to this particular valve does not reach a prescribed set maximum value and they open when this value is reached and thus throttle the stream flowing off through the particular relief-valve jet so that the pressure in the line in front of this valve remains as constant as possible at the level of the prescribed maximum pressure.

Depending on whether it appears more advantageous to have all the pressure medium stored in all the loaded ones of the four pressure reservoirs 16, 28, 33, and 38 immediately available for acceleration and/or utilization of the stored energy, or whether it appears more advantageous to empty one of the pressure reservoirs first and then the next and then the next, and so on, the control pressure response thresholds for the relief-valve jets 18, 30 and 35 can be graduated or staggered so that reservoirs are emptied one after the other, in which case care should be taken so that if a connection is made between a full pressure reservoir and one that has already been emptied, the pressure medium does not flow from the full one to the empty one. Therefore, controlled valves that prevent such an overflow should be installed here so that one of the pressure reservoirs after the other is connected with the connection 52, emptied, and then shut off, and then the next pressure reservoir is connected and emptied, such that overall a time slope of the pressure results at the connection 52, which corresponds to a "saw-tooth characteristic".

Instead of recalling the stored volume by arbitary action on the control pressure line 74, an automatic actuation can take place as a function of another operating characteristic.

Figure 3:
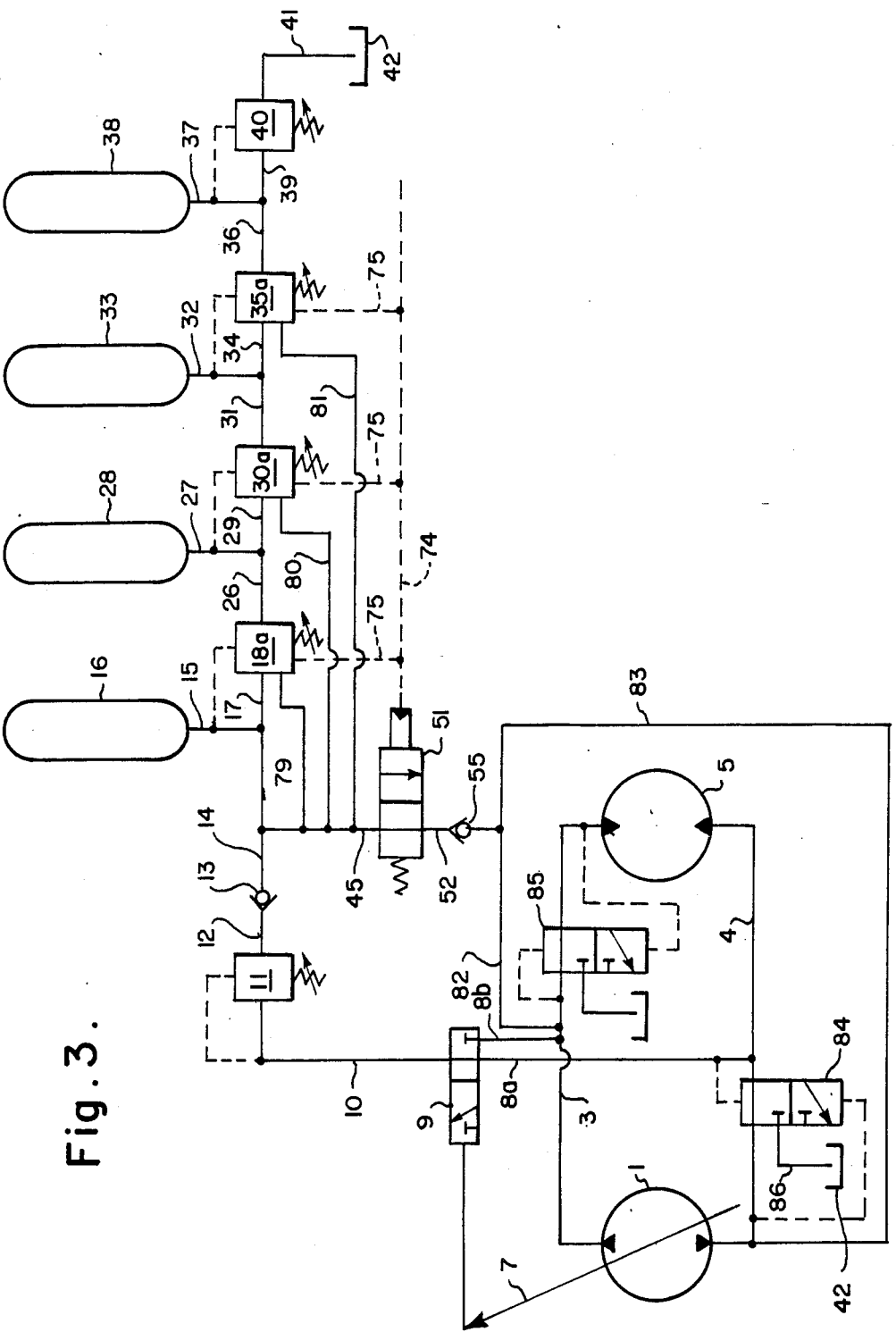
FIG. 3 shows a modified form of a connection of an energy storage system according to FIG. 1 to a hydrostatic drive operating in closed circuit.

The embodiment of the installation according to FIG. 3 has the same components for accumulating energy in the pressure reservoirs 16, 28, 33, and 38 as the installation according to FIG. 1. However, the system used for utilizing the energy stored in the pressure reservoirs 16, 28, 33, and 38 is different. The relief-valve jets 18a, 30a, and 35a differ from the relief-valve jets 18, 30, and 35 in that an additional connection is present, where line 79 is connected to relief-valve jet 18a, line 80 is connected to relief-valve jet 30a, and line 81 is connected to relief-valve jet 35a, and where the lines 79, 80, and 81 are connected to line 45. The valves 18a, 30a, and 35a can be arbitrarily controlled in succession through the control pressure line 74 or the control pressure branch lines 75 such that each of the pressure reservoirs 16, 28, 33, and 38 is connected in the appropriate sequence with line 45.

Another difference consists in the fact that the pressure medium flowing out of the reservoirs 16, 28, 33, and 38 is not added to the delivery stream of pump 1 as in the implementation according to FIG. 1, but is fed to the suction side of the pump as in the implementation according to FIG. 2. For this purpose, the outlet 52 of the arbitrarily actuatable valve 51 is connected through the by-pass check valve 55 to two lines 82 and 83, in which case line 82 is connected to line 3 and line 83 is connected to line 4 of the closed circuit of the hydrostatic drive 1, 3, 4, 5. If pump 1 is set by means of the final control element 7, for example, so that it delivers into line 3 and pressure medium is fed into line 4 through line 83, this pressure medium must be prevented from acting on the drain side of hydraulic motor 5. It is sufficient for this if a by-pass check valve is located between the connection of line 83 to line 4 and the hydraulic motor 5 in line 4. In addition, it must also be possible for the pressure medium draining from the hydraulic motor 5 to flow in a pressureless manner when the by-pass check valve is closed. For this purpose, the 2-position/3-connection valve 84 is provided; it is controlled by the pressure in line 4 in front of and beyond the multi-way valve 84. During normal operation of the drive 1, 3, 4, 5 the multi-way valve 84 is switched to free throughflow. However, if pressure medium flows through line 83 into line 4 between the pump 1 and the multi-way valve 84, the multi-way valve 84 closes off the portion of line 4 lying between the multi-way valve 84 and pump 1 and connects the portion of line 4 lying between the multi-way valve 84 and the hydraulic motor 5 with the line 85, which leads to the pressureless tank 82. In order that the multi-way valve 84 does not undesirably assume an erroneous setting if pump 1 of the hydrostatic drive delivers into the line in order to impart a desired direction of rotation to the hydraulic motor 5, it can also be provided that the control of the multi-way valve 84 be coupled with the setting of the final control element 7 of the hydraulic pump 1 and/or with the control of the multi-way valve 51.

For the case where a feeding of the energy stored in the pressure reservoirs 16, 28, 33, and 38 into the drive 1, 3, 4, 5 is desired, also with the other direction of delivery of pump 1, an appropriate multi-way valve 85, which corresponds to the multi-way valve 84, is also installed in line 3.

If the feeding is done on the suction side of pump 1 with a closed circuit, the drain of the hydraulic motor 5 should be connected with the pressureless tank 42 during this feeding in, and either pump 1 and correspondingly the motor 5 should be subjected to such a high pressure that the pressure on the inlet side of pump 1 matches the pressure in the reservoirs 16, 28, 33 or 38 and the maximum pressure rise for pump 1 can still be achieved, at least approximately, in it, so that there is a correspondingly higher pressure on the outlet side of the pump than the maximum in normal operation, or in the other implementations the maximum pressure on the outlet side of the pump 1 is limited to a maximum value that is independent of whether energy is fed in from the pressure reservoirs 16, 28, 33, and 38 or not. In this case the advantage of the invention arrangement consists only in that less energy must be imparted to the hydraulic pump 1 by the primary energy source during drainage of the reservoirs. The power of the hydraulic motor 5 is however not increased.

On the other hand, in the case of a closed circuit and during the feeding of the energy to be stored into the pressure reservoirs 16, 28, 33, and 38 either the feed pump must be designed so that it can deliver the full stream that can flow off maximally during an arbitrary period of time into the pressure reservoirs 16, 28, 33, and 38, in addition to the leakage losses to be considered, or pump 1 of the hydrostatic drive must be able to redraw through the resuction valves during the feed-in process (as is known in itself), in which case the volume of the reservoir from which either the feed pump 25 or, directly in the case of a resuction valve, the main pump 1 draws, must be sufficient so that an adequate volume is still available for the closed circuit of drive 1, 3, 4, 5, even if the pressure reservoirs 16, 28, 33, and 38 are completely full.

An expedient application possibility for such pressure reservoir systems results, for example, in vehicles with "hybrid drive" and hydraulic storage of energy (state of the art: *Hybrid-Antriebe, Aufgaben und Aufbau* (hybrid drives, purposes, and construction) VDI-Z (1975), No. 6, March, pp. 265–270 (indications of possibilities for reducing the energy losses through thermal influences are also given there) and *Development and Designs— Tendencies and Goals,* TR Technische Rundschau, Bern, No. 49 of Nov. 13, 1973). Another expedient application is in periodically operating hydraulic systems, e.g., in lift hydraulics, in which the rate of drop during lowering under load is to be braked by throttling processes in the hydraulic fluid streaming out, but then a load is again to be raised. In vehicles that have both a hydraulic lift apparatus and a hydraulic vehicular drive such as loading shovels, these two hydraulic systems operate with different pressure levels, but both apparatuses are connected together so that the reservoirs provided for the high pressure level still feed into the installation with the lower pressure level when they are substantially emptied, such that the energy can be utilized there.

In installations according to FIGS. 1 or 3, especially in travel drives, one possible construction is that in the braking state the pump 1 is swung into the zero-stroke position and if necessary the primary energy source driving the pump 1 is completely shut down and the entire delivery stream of the hydraulic motor 5 is fed to the pressure reservoirs. The energy stored in the pressure reservoirs 16, 28, 33, and 38 can then be utilized for restarting the primary energy source.

If it is arbitrarily assured, e.g., by means of the pressure gradient or additional external controlling devices, that the relief-valve jet 11 is completely closed during the discharging phase of the pressure reservoirs 16, 28, 33 and 38, the by-pass check valve 13 can be dispensed with. If it is assured that the multi-way valve 51 is completely shut off in the operating states involved, the by-pass check valve 55 can be omitted.

As is known, the braking action can be regulated sensitively by adjusting the response pressure of the relief-valve jet 11. For this purpose, the relief-valve jet can be connected with a brake pedal.

Basically, an arrangement and installation according to the invention can be advantageously used in combined apparatuses, in which pressure reservoirs for a high pressure level, e.g., for a travel drive, and components with or without pressure reservoirs for the lower pressure level are located on the same overall machine or apparatus. In this case it can be provided that the pressure reservoirs, so long as they are still at the high pressure level, be discharged into the apparatus with a high pressure level, while the residual energy of the reservoirs at the lower pressure level is fed into the apparatus with a lower pressure level. In a lift loader (forklift) with drive by internal-combustion engine and with a hydraulic lift pump, for example, if the stream forced out of the lifting cylinder during the lowering of the load is fed into a reservoir through a relief-valve jet acting as a lowering-braking regulating valve, this reservoir must be designed to match the pressure level of the hydraulic lift cylinder, i.e., so that it can store only a relatively small amount of energy in a relatively large space. The pressure level of lift hydraulics should be as high as possible with respect to the storage volume. If this same forklift has a hydrostatic travel drive, it operates with a greater hydraulic pressure, and if braking energy is to be stored, the reservoirs should be designed for the higher pressure of the travel hydraulics.

A particularly advantageous application of pressure reservoir systems with several reservoirs that are connected with each other through a restrictor in the described manner is in systems with a main pressure line held at as constant a pressure as possible and to which a hydraulic motor or several parallel-connected hydraulic motors are connected, in which case each hydraulic motor is provided with an r.p.m.-regulating unit and preferably is capable of being swung through the zero-stroke position into the opposite direction (the so-called systems "with impressed pressure"). If the system of pressure reservoirs 16, 28, 33, 38 for refeeding the stored energy is connected to the delivery line 3 of pump 1 so that the energy is to be discharged into this delivery line during the emptying of the pressure reservoirs, and if the valve 11 is such that, if there is a higher pressure in line 12 than in line 10, it reliably closes completely and which can also be arbitrarily opened at an arbitrarily selectable point in time to an arbitrarily selectable degree, perhaps through a control-pressure line (not shown in the drawing), then the more costly feedback arrangements shown in implementation examples 1 and 3 can be omitted and line 10 can be used not only for feeding into the system of pressure reservoirs 16, 28, 33, and 38, but also for discharging the energy from them. The construction costs can thus be substantially reduced.

The opening of the restrictor or the pressure at which the relief-valve jet 11 is set, and perhaps the additional restrictors and/or relief-valve jets 16, 30 and 35 and/or 16a, 30a, 35a can be influenced during the braking process through a control process, e.g., through the control line 74, for arbitrarily influencing the braking moment during the braking process. The regulation of the first relief-valve jet 11 in the direction of flow or a restrictor located in its place is perhaps sufficient for this. In a vehicular drive such a control system can be in active connection with the brake pedal for the throttling effect. Analogously, it can be provided that the energy reflux-inhibiting valve be arbitrarily opened for acceleration when the accelerator pedal is depressed through a certain threshold value, perhaps be opened to an arbitrarily selectable extent.

In an arrangement according to FIG. 2 the restrictor 11 can be designed as a stream-limiting valve that switches to a pressureless discharge of the delivery stream of the pump 63 so long as its delivery stream does not reach a prescribed maximum value, but effects a throttled connection to the reservoir system 16, 28, 33, 38 and thus loads the pump 63 through the throttling as soon as its delivery stream exceeds a prescribed maximum value. If the reservoir system 11, 16 or 11, 16, 18, 28 or 11, 16, 18, 28, 30, 33, and so on is connected to a hydrostatic drive 1, 3, 4, 5 operating in closed circuit in accordance with FIGS. 1 or 3, in which it is assured that the braking energy on the shaft 6 to be stored develops only with a certain direction of rotation of the latter, the multi-way valve 9 and the corresponding ones of lines 8a and 8b can drop out. If it is assured in such a drive that the stored energy is to be fed in only with a given direction of rotation of the shaft 6, the multi-way valve 53 and one of the line 54 or 57 and/or 82 or 83 can accordingly drop out.

In another embodiment of the solution according to FIG. 3 the multi-way valves 84 and 85 are designed so that line 10 is also controlled by the valves 84 and 85 and thus the multi-way valve 9 drops out.

In the foregoing specification, I have set out certain preferred practices and embodiments of this invention, however, it will be apparent that this invention may be otherwise embodied within the scope of the following claims. In a special manner, valves 9 and 11 can be combined to one embodiment.

I claim:

1. Hydraulic apparatus including a hydrostatic drive unit and means for storage of energy accumulated at certain stages of operation for use in braking by means of said hydrostatic unit comprising pump means driven by a source of energy, a hydrostatic motor, a pressure line receiving pressure fluid from said pump means connected to said hydrostatic motor, means for maintaining a predetermined pressure in said pressure line during storing of energy, at least one pressure reservoir receiving and storing fluid pressure, a first branch line connecting said pressure line to said at least one pressure reservoir, a restrictor means in said branch line between the pressure line and reservoir restricting flow in said line to maintain the predetermined constant pressure during braking therein, whereby a minimum predetermined braking pressure is available in the system at all times, a second branch line connected between said pressure reservoir and pressure line and a pilot valve in said second branch line whereby energy stored in the pressure reservoir can be delivered to the hydrostatic drive means by actuating the pilot valve.

2. Arrangement according to claim 1, characterized in that the restrictor is adjustable.

3. Arrangement according to claim 2, characterized in that the restrictor is designed as a pressure-limiting valve.

4. Arrangement according to claim 3, characterized in that the pressure-limiting valve is arbitrarily adjustable.

5. Arrangement in accordance with one of claims 1 or 2 or 3 or 4, characterized in that a third branch line is connected to the first branch line between the restrictor and a first pressure reservoir and that this second branch line leads to a second pressure reservoir and that a second restrictor is located in this second branch line, the second restrictor is controlled as a function of the pressure in front of it and is arbitrarily adjustable to a preselectable pressure and begins to open in a throttling manner when the pressure in front of this second restrictor has reached a boundary value set.

6. Arrangement according to claim 5, characterized in that several systems, each with a restrictor and a pressure reservoir, are connected one behind the other.

7. Arrangement according to claims 1 or 2 or 3 or 4 wherein the first branch line is connected to a hydrostatic drive system operating in closed circuit, characterized in that a partial branch line departs from each of two lines of the hydrostatic drive connecting a gear pump and a hydraulic motor and leads to a change-over valve, which is controlled by a regulating unit of the pump of the hydrostatic drive unit and connects a line connected with the suction side of the hydraulic pump with the branch line leading to the restrictor.

8. Arrangement according to claim 7, characterized in that the change-over valve is a valve that opens only when a prescribed maximum pressure is exceeded in the line leading to the suction side of the pump.

9. Arrangement according to claim 6 wherein the branch line is connected to a hydrostatic drive system operating in closed circuit, characterized in that a partial branch line departs from each of two lines of the hydrostatic drive unit connecting a gear pump and a hydraulic motor and leads to a change-over valve, which is controlled by a regulating unit of the pump of the hydrostatic drive unit and connects a line connected with the suction side of the hydraulic pump with the pressure line leading to the restrictor.

10. Arrangement according to claim 9, characterized in that the change-over valve is a valve that opens only when a prescribed maximum pressure is exceeded in the line leading to the suction side of the pump.

11. Arrangement according to one of claims 1 or 2 or 3 or 4, characterized in that a return line branches off from the branch line leading to the pressure reservoir and that a valve is located in said pressure line.

12. Arrangement according to claim 11, characterized in that the return line leading off from the pressure reservoir is connected to the suction connection of the pump between this pump and a valve.

13. Arrangement according to claim 12 in which the pressure line is part of a hydrostatic drive system operating in a closed circuit, said hydrostatic system including a hydraulic motor connected to said pressure line, characterized in that the valve is fully open during normal operation of said hydrostatic drive system in a drain line of the hydraulic motor, it severs the connection between the discharge connection of the hydraulic motor and a suction connection of the pump between the connection of the return line and the hydraulic motor and connects the discharge connection of the hydraulic motor to a pressureless drain.

14. Arrangement according to claim 12 with a pump drawing from a container characterized in that a bypass check valve opening to the pump is located in a suction line leading to the pump and the return line is connected from the pressure reservoir between this by-pass check valve and the pump to the suction line.

15. Arrangement according to claim 11, characterized in that the return line is connected to a line leading to the consumer and that a least one valve is located in the return line.

16. Arrangement according to any one of claims 1 through 4, characterized in that another consumer of hydraulic energy that is indirectly connected with the hydraulic pump is connected to the return line coming from the pressure reservoirs.

17. Arrangement according to claim 1, in which the line leading to the pressure reservoir is connected to the line leading to the consumer of hydraulic energy and is also designed to feed back the energy stored in the pressure reservoir to the consumer, characterized in that the restrictor is located in a valve which is automatically fully closed if a higher pressure prevails in the line between this valve and the pressure reservoir than in the line connecting the valve with the consumer, but where this valve can be arbitrarily opened in an arbitrary manner by arbitrary control intervention.

18. Arrangement according to claims 15 or 17 in the case of a vehicular drive, characterized in that the control for the arbitrary opening of the valve is connected in an opening manner with an accelerator pedal either immediately when the latter is actuated or it is actuated above a threshold value.

19. The use of an arrangement according to any one of claims 1 through 4 in an installation with component systems designed for different pressure levels, where the reservoirs can be connected in the upper load range with the component system for higher pressure and in the partially unloaded or not yet loaded range with the component system for the lower pressure level.

20. Arrangement according to claim 6, characterized in that the restrictor valves are arbitrarily adjustable for the discharging process.

* * * * *

UNITED STATES PATENT AND TRADEMARK OFFICE
CERTIFICATE OF CORRECTION

PATENT NO. : 4,674,280

DATED : June 23, 1987

INVENTOR(S) : HANS W. STUHR

It is certified that error appears in the above-identified patent and that said Letters Patent is hereby corrected as shown below:

Column 7, line 23, change "pressurelimiting" to --pressure-limiting--.

Column 8, line 41, change "multiway" to --multi-way--.

Column 14, line 19, change "line" to --lines--.

Column 16, line 7, after "container" insert --,--.

Signed and Sealed this

First Day of December, 1987

Attest:

DONALD J. QUIGG

Attesting Officer

Commissioner of Patents and Trademarks